(12) United States Patent
Gaw

(10) Patent No.: US 8,156,015 B1
(45) Date of Patent: Apr. 10, 2012

(54) METHOD, MEDIUM, AND SYSTEM FOR ASSOCIATING GRAPHICAL ICONS WITH DESTINATION ADDRESSES USING DRAG AND DROP

(75) Inventor: Derek Gaw, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/048,200

(22) Filed: Mar. 15, 2011

Related U.S. Application Data

(63) Continuation of application No. 11/847,546, filed on Aug. 30, 2007, now Pat. No. 7,930,220.

(51) Int. Cl.
*G06Q 30/00* (2012.01)
(52) U.S. Cl. ..................................... 705/27.2
(58) Field of Classification Search ................ 705/26.1, 705/27.1, 27.2
See application file for complete search history.

(56) References Cited

U.S. PATENT DOCUMENTS

| | | | | |
|---|---|---|---|---|
| 5,491,784 | A | * | 2/1996 | Douglas et al. ............... 715/810 |
| 5,570,291 | A | | 10/1996 | Dudle et al. |
| 5,583,984 | A | * | 12/1996 | Conrad et al. ................ 715/769 |
| 6,141,006 | A | * | 10/2000 | Knowlton et al. ........... 705/27.1 |
| 7,130,820 | B2 | * | 10/2006 | Song ............................ 705/7.18 |
| D544,877 | S | * | 6/2007 | Sasser ......................... D14/486 |
| 2001/0037260 | A1 | * | 11/2001 | Kim ............................... 705/26 |
| 2001/0042042 | A1 | * | 11/2001 | Stokes et al. .................. 705/42 |
| 2001/0049635 | A1 | * | 12/2001 | Chung ........................... 705/26 |
| 2002/0016750 | A1 | * | 2/2002 | Attia .............................. 705/26 |
| 2002/0038255 | A1 | * | 3/2002 | Tarvydas et al. ............... 705/26 |
| 2002/0152137 | A1 | * | 10/2002 | Lindquist et al. .............. 705/27 |
| 2003/0120505 | A1 | * | 6/2003 | Spiegel ............................ 705/1 |
| 2004/0090470 | A1 | | 5/2004 | Kim et al. |
| 2007/0022020 | A1 | * | 1/2007 | Bernstein ...................... 705/26 |
| 2008/0015952 | A1 | * | 1/2008 | Medved et al. ................ 705/27 |
| 2008/0154738 | A1 | * | 6/2008 | Jain et al. ...................... 705/26 |

OTHER PUBLICATIONS

Duyne, Douglas "The Design of Sites" Prentice Hall, Dec. 14, 2006.*
Sasser, C., Website published on the Internet at http://www.panic.com/goods, Jan. 2005, 3 pages.
Fuchs, T., Website published on the Interneet at http://demo.script.aculo.us/shop, Jan. 2005, 1 page.
Rathbone A, Dummies 101: Windows 95, IDG Books, 1996, pp. 19-21, 65, 80-81.

* cited by examiner

*Primary Examiner* — Yogesh C Garg
*Assistant Examiner* — Matthew Zimmerman
(74) *Attorney, Agent, or Firm* — Thomas, Kayden, Horstemeyer & Risley, LLP

(57) ABSTRACT

Various embodiments of a network page are provided. In one embodiment, at least one server serves up a network page to a client to be rendered on the client in a networked environment. The network page is associated with a network site that facilitates a purchase of items. The network page includes a graphical representation of a selected one of the items, and a plurality of destination regions, each of the destination regions being associated with a corresponding one of a plurality of shipping addresses. The network page is configured to facilitate an association of the selected one of the items with a respective one of the destination regions.

14 Claims, 4 Drawing Sheets

METHOD, MEDIUM, AND SYSTEM FOR ASSOCIATING GRAPHICAL ICONS WITH DESTINATION ADDRESSES USING DRAG AND DROP

CROSS REFERENCE TO RELATED APPLICATIONS

This application is a continuation of, and claims priority to, co-pending U.S. patent application entitled "METHOD, MEDIUM, AND SYSTEM FOR ASSOCIATING GRAPHICAL ICONS WITH DESTINATION ADDRESSES USING DRAG AND DROP" filed on Aug. 30, 2007 and assigned application Ser. No. 11/847,546, which is incorporated herein by reference in its entirety.

BACKGROUND

Online merchants currently facilitate the purchase of goods online by customers through the Internet. From time to time, customers may wish to ship purchases to multiple destinations. For example, a given customer may wish to purchase and ship a gift to one or more third parties that are located remote to the customer.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
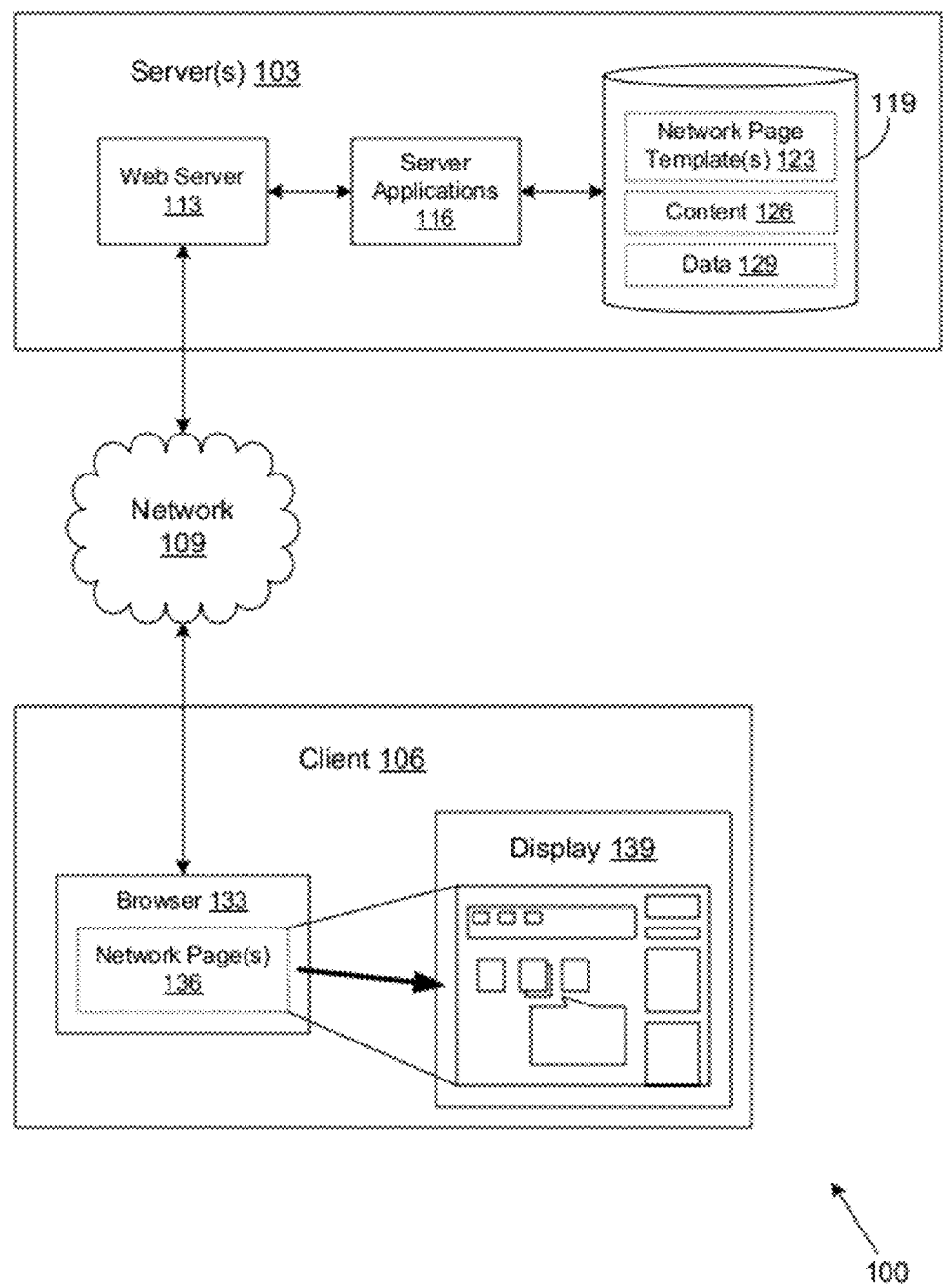
FIG. 1 is a drawing of a networked environment that includes at least one server and a client according to an embodiment of the present invention.

With reference to FIG. 1, shown is a network environment 100 that includes, for example, a server 103 and a client 106. The server 103 may represent multiple servers that may be arranged to work in coordination with each other. Alternatively, such servers may be arranged in some other manner as can be appreciated. The client 106 is representative of multiple clients 106 that access information on the server 103. Both the server 103 and the client 106 are coupled to a network 109. The network 109 may comprise, for example, any type of networked environment such as the Internet, intranets, local area networks, wide area networks, wireless networks, or other networks as can be appreciated.

In one embodiment, the server 103 includes a web server 113, various server applications 116, and one or more data stores 119. The web server 113 is one example of an application that is operated on a server 103 in order to provide browser access to the functions of the server 103 as determined by the server applications 116. To this end, the web server 113 acts as a gateway through which requests are received and responses transmitted to the clients 106. It is understood that other applications and components may be executed on the server 103 beyond those described herein.

The server applications 116 may provide many different applications that are involved, for example, in providing services offered by an online merchant or entity, and for providing other functions. For example, the server applications 116 may include applications that facilitate the ordering of goods online by customers through client machines 106 using browsers. Also, the server application 116 may interface with other systems to control activity in order fulfillment in fulfillment centers. The server applications 116 may also include applications that generate dynamic network pages such as, for example, dynamic web pages that are provided to clients 106 in response to various requests.

In order to provide network pages, the server applications 116 may access the data store 119 to obtain network page templates 123, various content items 126, and data 129. The network page templates 123 act as templates of network pages such as dynamic network pages that may ultimately be populated with the content 126 and data 129 also stored within the data store 119. As contemplated herein, the data store 119 may be representative of many different data stores included in a given system. The data store 119 may comprise, for example, a database or other data storage structure.

The client 106 also includes a browser 133 that is used to access a given network page 136 that is requested from the server 103. The network page 136 may be, for example, a dynamic network page such as a dynamic web page or other type of network page. For example, while navigating through the various network pages 136 made available through the server 103 so as to order various goods, the browser 133 may send a request for a specific network page 136 to the web server 113. The web server 113 will interface with the appropriate server application(s) 116 to generate the desired network page that is then transmitted to the browser 133 of the client 106.

Once the network page 136 is obtained, the browser 133 causes the network page 136 to be rendered on a display 139 of the client 106. According to one embodiment, the network page rendered by the browser 133 and generated by one or more server applications 116 may be dynamic in the sense that it is created on the fly by the server applications 116 accessing various data components stored in the data store 119. Also, the network pages 136 are dynamic in that a degree of functionality is associated with the network page 136 allowing a user to manipulate various components of the network page 136 at the client 106. Such functionality may include, for example, dragging and dropping various items in various locations within the network page 136, as will be discussed.

The server 103 may comprise multiple server computers that are typically referred to as "servers." Such servers may comprise computer systems that have been designed for running various server applications. The design of server computers accommodates handling the requests from multiple clients 106 as can be appreciated.

The client 106 may comprise, for example, a computer system or equivalent system that is capable of executing a browser 133 to access various resources in the network environment 100. For example, it is also possible that the client 106 may include various personal digital assistant devices that have a browser 133 and communicate wirelessly over the network environment 100. The client 106 may include various input devices such as, for example, a keyboard and a mouse. Alternatively, other input devices may be employed such as a keypad, touch pad, touch screen, microphone, scanner, joystick, or one or more push buttons, etc. The peripheral devices may also include the display device 139, indicator lights, speakers, printers, etc. The display device 139 may be, for example, cathode ray tubes (CRTs), liquid crystal display screens, gas plasma-based flat panel displays, or other types of display devices, etc.

Next, a general discussion of the operation of the various components of the network environment 100 is described. To begin, the user manipulates the browser 133 of the client 106 in order to access various network pages 136 that are served up by the server 103. Such network pages 136 may be accessed, for example, during the course of placing an order for goods with the entity that operates the servers 103. During this process, several network pages 136 may be accessed during which the user may specify multiple products to be shipped to multiple recipients. Such may be the case, for example, where the user wishes to send gifts to multiple persons that are located in geographically diverse areas relative to the user.

At some point in the process, a shipping address needs to be associated with each product selected for purchase or that has already been purchased. To this end, the user downloads the network page 136 that the browser 133 renders on the display 139. To serve up the network page 136, the web server 113 receives a request for the network page 136 and interfaces with the server applications 116 in order to generate the network page 136. The server applications 116 may then obtain a respective network page template 123 as well as various content 126 and other data 129 needed to generate the network page 136. Alternatively, the network page 136 may be generated in some other manner. The network page 136 is then transmitted to the client 106.

To this end, the network page 136 may include various executable components that are executed at the client 106 during the course of the user interaction with the network page 136 displayed on the display device 139. Alternatively, various executable components associated with the network pages 136 may be executed at the server 103, where the browser 133 may interface with the server 103 during the course of a user manipulation of the network page 136 rendered on the display device 139. Thus, various executable components associated with a network page 136 may be configured for execution in the client 106 alone, in the server 103 alone, or in both the client 106 and the server 103.

In this respect, the network page 136 may be created using various technologies that fall under the auspices of "Web 2.0." For example, one web development technology that is employed is termed "AJAX" which is an acronym that stands for "Asynchronous JavaScript and XML." In this sense, AJAX is asynchronous in that loading does not interfere with normal page loading. JavaScript is the programming language in which AJAX function calls are made. Data retrieved using this technique is commonly formatted using XML, which stands for "Extensible Markup Language." Alternatively, data formats or languages other than XML may be employed.

Alternatively, another technology that may be employed is ASP.NET, which is a web application framework marketed by Microsoft Corporation of Redmond, Wash. ASP.NET is one implementation of an AJAX framework and may be used to build dynamic web sites, web applications, and XML web services and is part of the Microsoft.NET platform, as can be appreciated.

Figure 2:
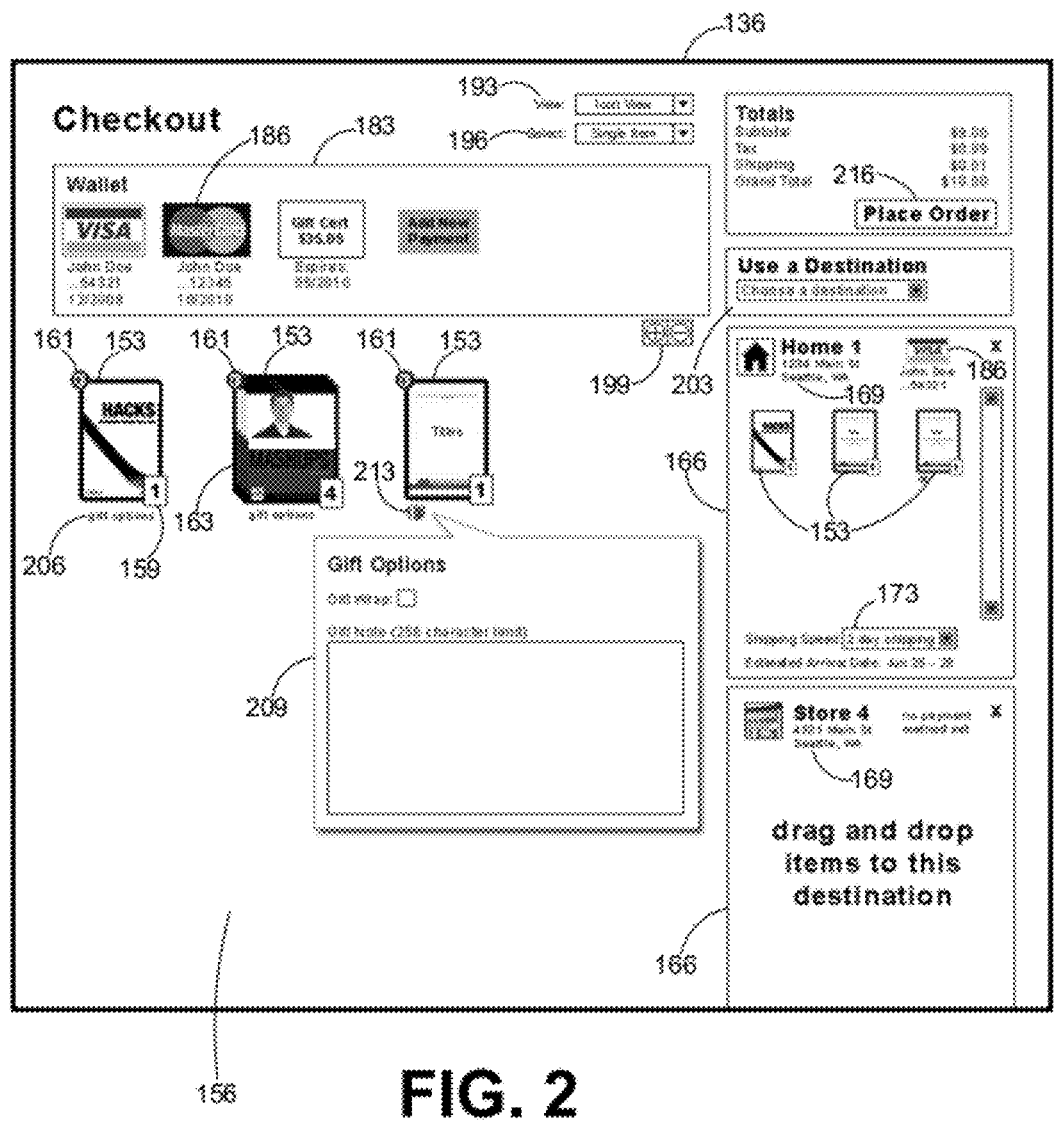
FIG. 2 is a drawing of a rendered network page that is served up to the client of FIG. 1 by the server(s) of FIG. 1 according to an embodiment of the present invention.

With reference to FIG. 2, shown is one example of the network page 136 as rendered on the display device 139 (FIG. 1) according to an embodiment of the present invention. In the example shown, the network page 136 as rendered includes graphical representations of selected items 153 that a user wishes to purchase. Such items are presumably selected from among those offered by the online merchant. Alternatively, the items 153 may already have been purchased and the network page 136 is presented to the user to obtain the shipping addresses to which each of the items are to be shipped. As such, references to payment types as will be described below may not be necessary in such a scenario.

Initially, the graphical representation of each of the items 153 is displayed in a product listing region 156 of the network page 136. As contemplated herein, reference to "items" 153 refers to the graphical representation of the items 153 as rendered as part of the network page 136. The items 153 displayed in the product listing region 156 are those for which a shipping address has yet to be specified. The items 153 may be displayed as single items or, where two or more of the same item is to be shipped, the items 153 may be displayed with a quantity value 159 to indicate a total quantity of the items 153 purchased. Alternatively, quantities of two or more of the same item may be indicated by arranging multiple examples of individual items 153 in a stack 163.

A user may manipulate various components of the network page 136 by manipulating, for example, a mouse or keyboard. One may manipulate such components, for example, by "clicking" on them. As contemplated herein, the term "clicking" refers to positioning a cursor over a displayed item using a mouse, for example, and pressing a button on the mouse or other input device as can be appreciated.

Associated with each of the items 153 is an indicator 161 that denotes a class of items to which the respective ones of the items 153 belongs. For example, where the item 153 is a book, the indicator 161 may comprise an icon of a book, etc. Many other types of indicators 161 may be used, where those relating to books are depicted in FIG. 2 as examples.

The network page 136 also includes destination regions 166. Associated with each destination region 166 is a shipping address 169. Respective ones of the items 153 may be associated with the destination regions 166 as will be described. Also associated with each of the destination regions 166 are shipping options 173. The shipping options 173 may be embodied in the form of a pick list or other selection mechanism that allows the user to select a given shipment method for the items 153 listed or associated with a given destination region 166. Alternatively, the shipping options 173 may be associated with individual items 153 within a destination region 166.

The network page 136 also includes a payment type region 183 in which a number of graphical representations of payment types 186 are displayed. The payment type region 183 may also be termed a "wallet." As contemplated herein, reference to a "payment type" as depicted in the network page 136 refers to the graphical representation of the payment type 186 that is associated with a respective method of payment. Each of the payment types 186 may comprise, for example, a credit card, gift certificate, check, money order, or other payment type as can be appreciated. A given payment type 186 may be dragged over to the destination regions 166 and associated therewith as will be described. Alternatively, the payment types 186 may be dragged directly over price totals associated with items to be purchased or are listed in a destination region 166 to associate the payment type 186 with the amounts to be paid.

The network page 136 also includes a view selector 193 that allows the user to select a type of view that determines how the items 153 and perhaps other components of the network page 136 are rendered as will be described. Also, a single/multiple item selector 196 is included that allows a user to specify whether they wish to select a single one of, or multiple ones of the items 153 to be dragged to and dropped in a respective destination region 166. In addition, the network page 136 includes size selectors 199 that may be manipulated to change the size of the items 153 as they are displayed in the product listing region 156 so that individuals can adjust the sizes accordingly to suit their visual preferences.

The network page 136 also includes a destination region selector 203 that allows a user to identify a current destination region 166 to be generated in the network page 136. Alternatively, the destination region selector 203 may provide for selecting one of a plurality of destination regions 166 to be displayed in a superior position in the network page 136 for easy access relative to other listed destination regions 166. To the extent that the destination regions 166 extend beyond the view of a display device 139, then a scroll bar may be included that allows the user to scroll the network page 136 so that it can be greater than the area of the screen of the display 139 upon which it is rendered. Also, a scroll bar may be associated with a given destination region 166 or the product listing area 156 where the items 153 associated with these areas do not fit therein.

In addition, the network page 136 also includes gift wrap links 206 that may be manipulated by a user to generate a gift wrap options window 209 by which a user may specify gift wrap options for given ones of the items 153. Once the gift wrap options have been specified, then a gift wrap indicator 213 is associated with the item 153 indicating that gift wrap options have been specified for the item 153. The gift wrap options window 209 allows a user to specify that the item be gift wrapped and also allows the user to enter a note to be shipped with the item 153. Also, other gift wrap options may be included such as the type of wrapping paper used, the selection of bows, or other gift wrap options as can be appreciated.

The network page 136 also includes an order execution button 216 that may be manipulated by a user in order to cause the order to be processed and the items to be shipped to their respective destination addresses specified by the destination regions 166 when the user has completed associating each of the items 153 with a given one of the destination regions 166.

Next, the general operation of the network page 136 is described as it would be manipulated by a user. According to one embodiment, the network page 136 is "dynamic" in that it allows a user to make substantial changes to the appearance of the network page 136 to perform various functions. The network page 136 includes logic to allow a user to associate the selected ones of the items 153 displayed in the product listing region 156 with various ones of the destination regions 166. This may be done, for example, by dragging the items 153 from the product listing region 156 over to one of the destination regions 166 and dropping the items in the respective destination regions 166.

This may be accomplished by hovering a cursor over a given one of the items 153, holding down a button on a mouse or other input device, and moving the mouse or other device such that the item 153 moves with the cursor until it is positioned over the destination region 166. Thereafter, when an individual releases the button on the mouse or other input device, the item 153 falls into the destination region 166 and is displayed therein. In this manner, a user can easily associate each one of the items 153 listed in the product listing region 156 with a given shipping address 169. This graphical approach to associating the items 153 with the destination regions 166 and their corresponding shipping addresses 169 provides an advantageous approach to ensuring that various items 153 are shipped to the proper locations. Also, the specification of a shipping address for each of the items 153 may be completed in an expeditious manner.

Alternatively, items 153 may be associated with respective ones of the destination regions 166 by manipulating a keyboard, microphone, or other input device associated with the client 106. For example, a keyboard may be manipulated to highlight or otherwise select one or more items 153 and to designate or select one of the destination regions 166. The keyboard may then be used to cause the items 153 to be associated with the respective destination regions 166 without dragging the items 153 as set forth above. Still further verbal commands received from a microphone maybe interpreted in order to facilitate associating the items 153 with the destination regions 166.

In addition, the network page 136 also facilitates the display of two or more of given items 153 by showing the quantity value 159 associated with each of the items 153, or by indicating multiple instances of an item 153 arranged in a stack 163. Also, the indicator 161 associated with each of the items that indicates the class of items to which the items 153 belong provides further information to a user as to the precise nature of the items 153, where multiple different types of items 153 may be displayed in the product listing region 156 having previously been selected by a user for purchase as can be appreciated.

In order to associate gift wrap options with a given one of the items 153, a user may manipulate a gift wrap link 206 that is associated with each of the items 153. Each of the gift wrap links 206 is associated with a given one of the items by placing it in close proximity with the item 153. One may manipulate the gift wrap link 206 by moving a cursor over the link and clicking on the link as can be appreciated.

Once the user has clicked on the gift wrap link 206, then the gift wrap options window 209 is generated by the network page 136. The gift wrap options window 209 provides for an ability of a user to specify that gift wrapping is to be performed on a given item 153. Also, the gift wrap options window 209 allows a user to enter a note that is to be shipped along with the item 153. Such may be a greeting such as a birthday wish or other greeting, as can be appreciated.

In addition, many other gift wrap options may be made available such as, for example, specifying a type of wrapping paper or other options as can be appreciated. Once the gift wrap options have been specified for a given item 153, then the gift wrap indicator 213 is displayed in association with the respective item 153. This indicates to a user that gift wrapping has been specified for the given one of the items 153. Where items 153 are arranged in a stack 163, then the gift wrap indicators 213 may also be stacked accordingly.

When items 153 are dragged from the product listing region 156 to a respective one of the destination regions 166 and dropped therein, the gift wrap indicator 213 is dragged along with the item 153. In addition, the quantity value 159 may also be dragged with an item if two or more of the same item is to be shipped to the same destination region 166. It is also possible to select two or more items 153 in a stack 163 and drag and drop the stack 163 into a respective destination region 166.

They network page 136 also facilitates associating given ones of the payment types 186 with respective ones of the destination regions 166. In this respect, the items 153 associated with a given destination region 166 may be paid for using the payment type 186 that is ultimately associated with the destination region 166. This may reflect the fact that a given organization may wish to use different methods of payment to keep track of items purchased for different purposes and for items shipped to different locations.

The network page 136 includes logic that facilitates the association of respective payment types 186 with given ones of the destination regions 166. Specifically, in one embodiment, the user may drag a payment type 186 to a respective one of the destination regions 166 and drop the payment type 186 in the respective one of the destination regions 166. If a payment type is already associated with the given destination region 166, then a new payment type 186 that is dropped into the destination region 166 replaces the existing payment type 186 associated therewith. Also, the user may click on appropriate interface components to add new payment types as desired.

The view selector 193 may be manipulated so as to determine how the items 153 are displayed in the product listing region 156 and/or the destination regions 166. Alternatively, multiple view selectors 193 may be used, one for each of the destination regions 166 and for the product listing region 156. The items 156 may be represented by icons, images representative of the items, or a textural listing of the items 153. Alternatively, the items 153 may be represented in some other manner. The size selector 199 allows a user to specify a size of the items 153 that are displayed in the product listing region 153 and/or the destination regions 166 in accordance with user preferences.

Also, the single/multiple selector 196 allows a user to place the network page 136 in a mode whereby multiple ones of the items 153 may be selected in the product listing region 156 and then dragged in unison to a given one of destination regions 166. The items 153 may be selected by clicking thereon or by using some other selection mechanism. This eliminates the need for a user to individually drag and drop each one of the items into a respective destination region 166 by allowing one to drag and drop multiple items together. When the single/multiple selector 196 is in the single item mode, then a user can select individual ones of the items 153 and drag and drop them in the respective destination regions 166.

The shipping options 173 associated with each of the destination regions 166 allows users to determine how items will be shipped to their respective shipping addresses 169 associated with respect to the ones of the destination addresses 166. Various shipping modes may be selected, such as, for example, overnight shipping, two-day shipping, three-day shipping, standard shipping, express shipping, or shipping by other methods.

Still further, the network page 136 also includes the size selector 199 by which a user can vary the sizes of the graphical depictions of the items 153 as shown in the product listing region 156. Alternatively, the size selector 199 may apply to the size of all components on the entire network page 136, where relative positioning of the items may change to accommodate different sizes as can be appreciated. Still further, multiple size selectors 199 may be used in the various regions such as the payment type region 183, and the destination regions 166 to adjust the sizes of items displayed therein. Where the sizes of items 153, payment types 186, and textural items associated with the various components of the network page 136 are varied and are too large to fit within a given region, then scroll bars may be employed to accommodate scrolling among the various items 153, payment types 186, or other components within a given region as can be appreciated.

Figure 3:
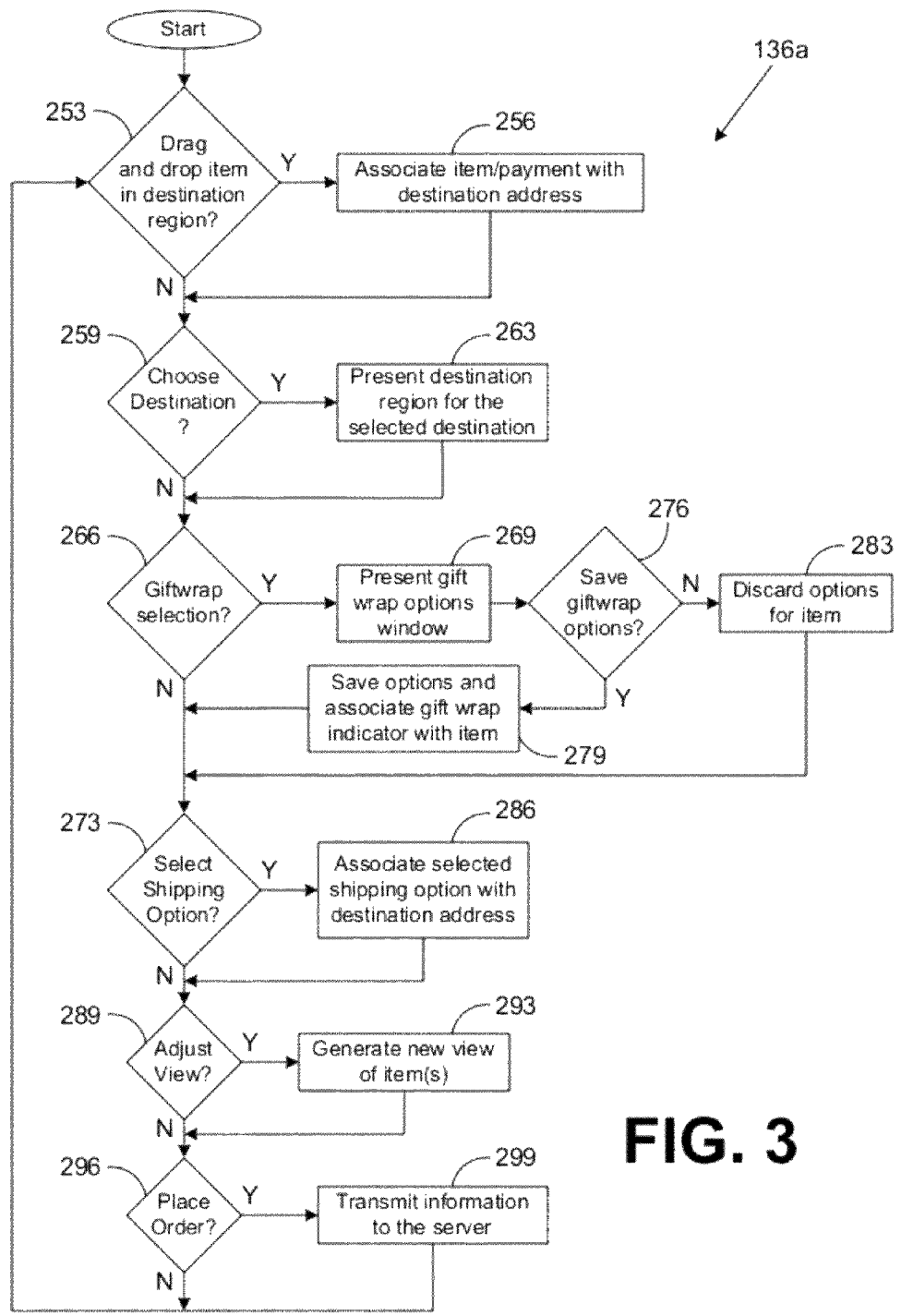
FIG. 3 is a flow chart that illustrates functionality associated with the network page of FIG. 2 according to an embodiment of the present invention.

Referring next to FIG. 3, shown is a flow chart that provides one example of the operation of executable portions of the network page 136 denoted herein as network page logic 136a according to an embodiment of the present invention. The network page logic 136a may be implemented, for example, in the client 106 or the server 103, or both. Alternatively, the flow chart of FIG. 3 may be viewed as depicting steps of an example of a method implemented in the client 106 (FIG. 1), the server 103 (FIG. 1), or both to provide for the association of items 153 (FIG. 2) with shipping addresses 169 (FIG. 2) associated with destination regions 166 (FIG. 2).

The functionality of the executable portions of the network page 136 as depicted by the example flow chart of FIG. 3 may be implemented, for example, in an object oriented design or in some other programming architecture. Assuming the functionality is implemented in an object oriented design, then each block represents functionality that may be implemented in one or more methods that are encapsulated in one or more objects. The executable portions of the network page 136 may be implemented using any one of a number of programming languages such as, for example, C, C++, JAVA, or other programming languages.

Beginning with box 253, the network page logic 136a determines whether an item 153 or payment type 186 (FIG. 2) has been dragged and dropped into a given destination region 166. If so, then the network page logic 136a proceeds to box 256 in which the item 153 is associated with the given destination region 166, thereby associating the same with the corresponding shipping address 169 of the destination region 166. Also, the payment type 186 is associated with each of the items 153 in the destination region 166 to be used to pay for such items 153. Note that the associations may be made graphically by depicting the image of the item 153 or payment 186 within the destination region 166 as described above. Thereafter, the network page logic 136a proceeds to box 259. If in box 253 no item has been dragged and dropped into a destination region 166, then the network page logic 136a proceeds directly to box 259.

Next, in box 259, the network page logic 136a determines whether a user has selected a given destination by virtue of the destination region selector 203. If so, then in box 263 the destination region for the selected destination is depicted in the user interface. Where only a single destination region can be depicted at a time, then the currently selected destination region is depicted depending on the selection made. However, where multiple destination regions 166 are depicted, then the selected one may be positioned in a priority location (i.e. at the top of the list of destination regions 166) to provide easier access in order to drag and drop items or payments therein. Thereafter, the network page logic 136a proceeds to box 266. If no selection was made in box 259, then the network page logic 136a also proceeds directly to box 266.

Next, in box 266, the network page logic 136a determines whether a gift wrap link 206 (FIG. 2) was manipulated, indicating that the user wishes to make a gift wrap selection. If so, then the network page logic 136a proceeds to box 269. Otherwise, the network page logic 136a progresses directly to box 273.

In box 269, the gift wrap options window 209 is generated so that a user may specify gift wrap options for a given item 153. Thereafter, in box 276, it is determined whether the user wishes to save the gift wrap items by manipulating an appropriate user interface component such as the checkbox within the gift options window. Assuming that the gift wrap options are to be saved in association with the item 153, then the network page logic 136a proceeds to box 279 in which the gift wrap options specified are saved in association with the given item 153 and the gift wrap indicator 213 is also associated with the item 153 graphically on the display device. Thereafter, the network page logic 136a proceeds to box 273.

However, assuming that no gift wrap options are to be saved in box 276, then the network page logic 136a proceeds to box 283 in which the specified options in the gift wrap options window 209 are discarded. Thereafter, the network page logic 136a proceeds to box 273.

Next, in box 273, it is determined whether the user has altered a shipping option by manipulating a respective one of the shipping options 173 in a given destination region 166. If such is the case, then in box 286 the network page logic 136a associates the selected shipping option with the destination region 166 and, correspondingly, with items 153 associated with the respective destination region 166. Thereafter, the network page logic 136a proceeds to box 289. Similarly, if no selection of the shipping option occurs in box 273, then the network page logic 136a proceeds directly to box 289.

In box 289, the network page logic 136a determines whether the display of the network page 136 is to be altered due to an adjustment. Such an adjustment may involve, for example, manipulating the view selector 193 or the item size selection mechanism 199, or other mechanism as described above. If such is the case, then the network page logic 136a proceeds to box 293 in which the new view of any altered items is displayed. Thereafter, the network page logic 136a proceeds to box 296. Likewise, if no adjustment to the view of the network page 136 is made in box 289, then the network page logic 136a proceeds to box 296.

In box 296, it is determined whether the user wishes to place an order by manipulating the order button 216 (FIG. 2). If such is the case, then the network page logic 136a proceeds to transmit the order information to the server in box 299. If no order is placed in box 296 or once the information is transmitted in box 299, then the network page logic 136a reverts back to box 253 as shown. Note that the shipping address information associated with the items 153 listed in the respective destination regions 166 is provided to the server 103 in order to allow the items 153 to be shipped to the respective shipping addresses.

In addition, there may be other functionality as described above that is not depicted in the flowchart of FIG. 3 that is executed in coordination with any manipulation of various components of the network page 136 as can be appreciated.

Figure 4:
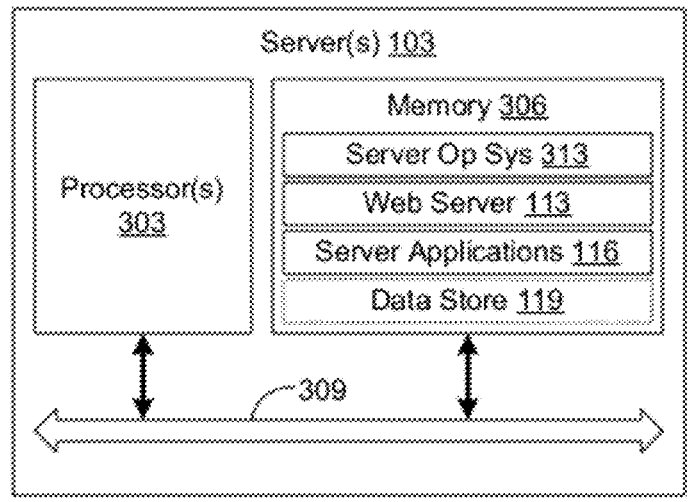
FIG. 4 is a schematic block diagram of one embodiment of the server(s) of FIG. 1 according to an embodiment of the present invention.

With reference to FIG. 4, shown is one example of a server 103 according to an embodiment of the present invention. The server 103 may include one or more processor circuits having a processor 303 and a memory 306, both of which are coupled to a local interface 309. In this respect, the local interface may comprise, for example, a data bus with an accompanying control/address bus as can be appreciated. The server 103 is one example of a server computer that may be employed as can be appreciated.

Stored on the memory 306 and executable by the processor 303 are various components such as a server operating system 313, the web server 113, and the server applications 116. Also, the data store 119 may be located in the memory 306 as can be appreciated. In addition, it is understood that many other components may be stored in the memory 306 and executable by the processors 303.

Figure 5:
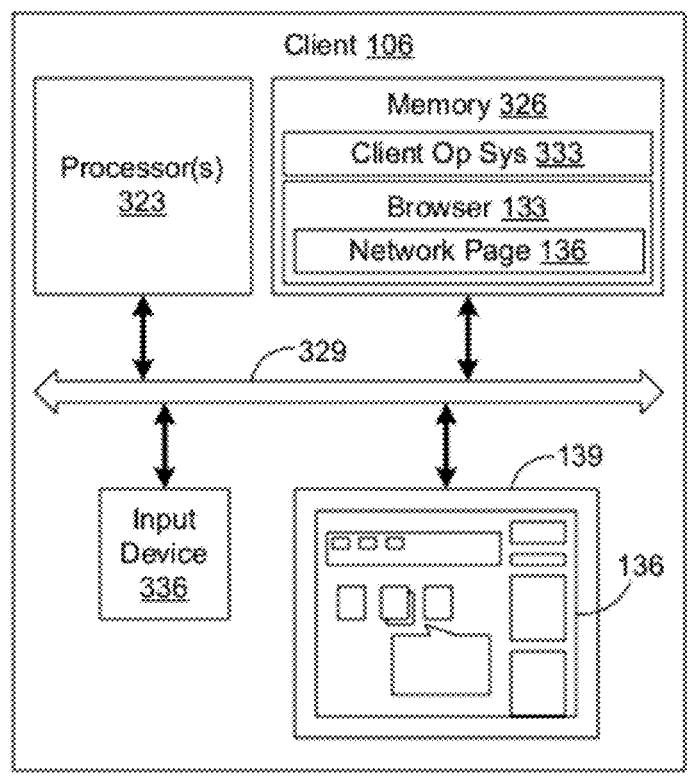
FIG. 5 is a schematic block diagram of one embodiment of the client of FIG. 1 according to an embodiment of the present invention.

With reference to FIG. 5, shown is one example of a client 106 according to an embodiment of the present invention. As shown, the client 106 also includes a processor circuit having a processor 323 and a memory 326, both of which are coupled to a local interface 329. Stored in the memory 326 and executable by the processor 323 are a client operating system 333 and a browser 133. The browser is executed to access and render the network page 136 as described above. The client 106 also may include one or more input or peripheral devices 336 as described above. Also, the client 106 includes the display device 139 upon which the network page 136 is rendered.

As set forth above, with reference to both FIGS. 4 and 5, a number of components are stored in the memories 306 and 326 and are executable by the respective processors 303 and 323. In this respect, the term "executable" refers to a program file that is in a form that can ultimately be run by the respective processors 303 and 323. Examples of executable programs may be, for example, a compiled program that can be translated into machine code in a format that can be loaded into a random access portion of the memories 306 and 326 and run by the processors 303 and 323, respectively, or source code that may be expressed in proper format such as object code that is capable of being loaded into a of random access portion of the memories 306 and 326 and executed by the processors 303 and 323, respectively. An executable program may be stored in any portion or component of the memories 306 and 326 including, for example, random access memory, read-only memory, a hard drive, compact disk (CD), floppy disk, or other memory components.

Each of the memories 306 and 326 is defined herein as both volatile and nonvolatile memory and data storage components. Volatile components are those that do not retain data values upon loss of power. Nonvolatile components are those that retain data upon a loss of power. Thus, each of the memories 306 and 326 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 303 and 323 may represent multiple processors and each of the memories 306 and 326 may represent multiple memories that operate in parallel processing circuits, respectively. In such a case, each of the local interfaces 309 and 329 may be an appropriate network that facilitates communication between any two of the multiple processors, between any processor and any of the memories, or between any two of the memories, etc. The processors 303 and 323 may be of electrical or optical construction, or of some other construction as can be appreciated by those with ordinary skill in the art.

The operating systems 313 and 333 are executed to control the allocation and usage of hardware resources such as the memory, processing time and peripheral devices in the server 103 and the client 106. In this manner, the operating systems 313 and 333 serve as the foundation on which applications depend as is generally known by those with ordinary skill in the art.

Although the functionality of the network page 136 is described as being embodied in software or code executed by general purpose hardware as discussed above, as an alternative the same may also be embodied in dedicated hardware or a combination of software/general purpose hardware and dedicated hardware. If embodied in dedicated hardware, the functionality of the network page 136 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams, user interfaces, and/or the flow chart of FIGS. 1-5 show the architecture, functionality, and operation of an implementation of the network page 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the network page 136 is expressed in the form of software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the network page for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system, comprising:
    at least one computing device; and
    an application executable in the at least one computing device, the application being configured to cause the at least one computing device to:
        generate a network page that facilitates a purchase of at least one item selected by a customer;
        generate an item region, on the network page, that includes a respective graphical icon for each one of the at least one item and an overlapping numerical quantity icon that overlaps and visually conceals at least a portion of the graphical icon of the corresponding at least one item, wherein the numerical quantity represents a quantity to be purchased of the at least one item;
        generate a respective destination region, on the network page, for each one of a plurality of shipping addresses associated with the customer; and
        transmit code to another at least one computing device, the code being configured to cause the other at least one computing device to associate an item of the at least one item and the corresponding overlapping numerical quantity icon with one of the shipping addresses in response to the corresponding graphical icon of the item being dragged from the item region and dropped into the corresponding destination region of the one of the shipping addresses, wherein the corresponding graphical icon of the item and the corresponding overlapping numerical quantity icon graphically persist on the network page in the corresponding destination region.

2. The system of claim 1, wherein the respective graphical icon for each one of the at least one item comprises a corresponding image that is representative of the one of the at least one item.

3. The system of claim 1, wherein the application is further configured to cause the at least one computing device to:
    generate a gift wrap link, on the network page, in association with the graphical icon of a corresponding one of the at least one item; and
    transmit gift wrap option code to the other at least one computing device, wherein the gift wrap option code is configured to cause the other at least one computing device to generate a gift wrap option window that facilitates a specification of gift wrap options for the corresponding one of the at least one item.

4. The system of claim 3, wherein the gift wrap option code is further configured to cause the other at least one computing device to generate a gift wrap icon, on the network page, in association with the graphical icon for the corresponding one of the at least one item when at least one gift wrap option is specified.

5. The system of claim 1, wherein the application is further configured to cause the at least one computing device to generate a shipping option, on the network page, in association with each of the destination regions, wherein each shipping option indicates a method of shipment for at least one item associated with the respective destination region to the shipping address associated with the respective destination region.

6. The system of claim 1, wherein the application is further configured to cause the at least one computing device to generate an class icon, on the network page, in association with the graphical icon of a corresponding one of the at least one item, the class icon denoting a class of items to which the corresponding one of the at least one item belongs.

7. The system of claim 1, wherein the application is further configured to cause the at least one computing device to generate a stack of overlapping identical graphical icons that is employed to represent an item having a quantity greater than one.

8. A method, comprising the steps of:
 obtaining, in at least one computing device, a network page that facilitates a purchase of at least one item selected by a customer;
 rendering, in the at least one computing device, an item region, on the network page, that includes a respective graphical icon for each one of the at least one item and an overlapping numerical quantity icon that overlaps and visually conceals at least a portion of the graphical icon of the corresponding at least one item, wherein the numerical quantity represents a quantity to be purchased of the at least one item;
 rendering, in the at least one computing device, a respective destination region, on the network page, for each one of a plurality of shipping addresses associated with the customer; and
 associating, in the at least one computing device, an item of the at least one item and the corresponding overlapping numerical quantity icon with one of the shipping addresses in response to the corresponding graphical icon of the item being dragged from the item region and dropped into the corresponding destination region of the one of the shipping addresses, wherein the corresponding graphical icon of the item and the corresponding overlapping numerical quantity icon graphically persist on the network page in the corresponding destination region.

9. The method of claim 8, further comprising the step of:
 sending, in the at least one computing device, a request to select the at least one item to at least one server; and
 wherein the network page is obtained from the at least one server.

10. The method of claim 8, wherein the associating step further comprises the step of sending, in the at least one computing device, an association of the item of the at least one item with the one of the shipping addresses to at least one server.

11. The method of claim 8, further comprising the step of rendering, in the at least one computing device, a stack of overlapping identical graphical icons that is employed to represent an item having a quantity greater than one.

12. A non-transitory computer-readable medium embodying at least one program that is executable in at least one computing device, the at least one program comprising:
 code that generates a network page that facilitates a purchase of at least one item selected by a customer;
 code that generates an item region, on the network page, that includes a respective graphical icon for each one of the at least one item and an overlapping numerical quantity icon that overlaps and visually conceals at least a portion of the graphical icon of the corresponding at least one item, wherein the numerical quantity represents a quantity to be purchased of the at least one item;
 code that generates a respective destination region, on the network page, for each one of a plurality of shipping addresses associated with the customer; and
 code that transmits association code to another at least one computing device, the association code being configured to cause the other at least one computing device to associate an item of the at least one item and the corresponding overlapping numerical quantity icon with one of the shipping addresses in response to the corresponding graphical icon of the item being dragged from the item region and dropped into the corresponding destination region of the one of the shipping addresses, wherein the corresponding graphical icon of the item and the corresponding overlapping numerical quantity icon graphically persist on the network page in the corresponding destination region.

13. The non-transitory computer-readable medium of claim 12, further comprising:
 code that generates a payment type region, on the network page, that includes a respective graphical icon for each one of at least one payment type associated with the customer; and
 code that associates a payment type of the at least one payment type with one of the shipping addresses in response to the corresponding graphical icon of the payment type being dragged from the payment type region and dropped into the corresponding destination region of the one of the shipping addresses.

14. The non-transitory computer-readable medium of claim 13, wherein the corresponding graphical icon of the payment type graphically persists on the network page in the corresponding destination region.

\* \* \* \* \*